United States Patent [19]

Lindgren

[11] Patent Number: 5,965,182
[45] Date of Patent: Oct. 12, 1999

[54] ANIMAL CHEW AND PLAY TOY AND A TREAT CONTAINER

[76] Inventor: Tony Mikael Lindgren, 1408 25th Ave., San Francisco, Calif. 94122

[21] Appl. No.: 08/861,583

[22] Filed: May 22, 1997

[51] Int. Cl.[6] .......................... A21D 10/02; A01K 29/00; B65D 33/24
[52] U.S. Cl. ...................... 426/104; 426/115; 426/805; 119/707; 383/43; 446/386; 150/150
[58] Field of Search ................... 426/104, 115, 426/112, 805; 119/702, 707, 709, 710, 711; 383/43, 907; 150/150, 151, 900, 119, 120; 446/386

[56] References Cited

U.S. PATENT DOCUMENTS

| | | |
|---|---|---|
| D. 328,805 | 8/1992 | O'Rourke . |
| D. 329,310 | 9/1992 | O'Rourke . |
| D. 350,629 | 9/1994 | Scrani . |
| 1,149,170 | 8/1915 | Allis . |
| 1,534,964 | 4/1925 | Kahnweiler ........................ 119/711 |
| 3,871,334 | 3/1975 | Axelrod . |
| 4,513,014 | 4/1985 | Edwards . |
| 4,557,219 | 12/1985 | Edwards . |
| 5,069,261 | 12/1991 | Ji ............................................. 150/150 |
| 5,092,272 | 3/1992 | O'Rourke . |
| 5,263,436 | 11/1993 | Axelrod . |
| 5,339,771 | 8/1994 | Axelrod . |
| 5,343,828 | 9/1994 | Houghton et al. . |
| 5,351,650 | 10/1994 | Graves . |
| 5,553,570 | 9/1996 | Vannatter, III et al. . |
| 5,595,142 | 1/1997 | Chill . |

FOREIGN PATENT DOCUMENTS

PCT/DK95/ 00257   6/1995   WIPO .

OTHER PUBLICATIONS

R.C. Steele Wholesale Pet and Animal Care Supplies Catalog Summer Preview 1997 Edition.

*Primary Examiner*—David Lacey
*Assistant Examiner*—Hao Mai
*Attorney, Agent, or Firm*—Bruce & McCoy

[57] ABSTRACT

An elastic or flexible spherical animal toy, be having an interior space (15) and a slit or narrow opening (11) of elongated shape through the housing to the interior space (15). The slit or narrow opening (11) widens into a hole when pressure is applied to the ends of the slit or narrow opening, allowing a treat (17), such as animal food, treat or odor producing substances, inside the toy to fall out. An animal can typically open the slit (11) occasionally gain access to items placed inside the toy by biting or squeezing the toy.

2 Claims, 3 Drawing Sheets

ANIMAL CHEW AND PLAY TOY AND A TREAT CONTAINER

BACKGROUND OF THE INVENTION

1. Field of The Invention

This invention relates to chew and play toys for domestic pet animals. More particularly, it relates to a treat container for domestic pets, such as dogs and cats, which can be actuated during play by a pet to release a predetermined item contained in the toy such as animal food, a treat, or an odor-emitting substance.

2. Description of the Prior Art

Many domestic pets, such as dogs and cats, like to play with toys by chewing, pulling and pushing them, or moving them around with their nose, teeth, and front legs. This behavior is natural to animals, and keeps the animals active and develops their motor coordination. Also, if there are not any toys available for the animal, damage to items surrounding the pet can occur. For example, domestic pets can damage the furniture, carpeting, walls, and shoes.

The prior art reveals a variety of toys intended for animals. Some examples of the chew and play toys available for animals are rawhide chews or bones, cloth pulls and ropes, as well as various vinyl, plastic, rubber and latex toys. In this application, any toy that an animal can chew or play with is called a chew and play toy.

Some available chew and play toys are the various tug-of-war toys such as cloth ropes and rubber pulls in O'Rourke's U.S. Pat. No. 5,092,272; U.S. Pat. No. Des. 329,310 and U.S. Pat. No. Des. 328,805. There are toys manufactured from vinyl or a hard nylon polymer in various shapes and sizes, such as Axelrod's U.S. Pat. No. 5,263,436 and Scrani's U.S. Pat. No. Des. 350,629. Also, there are various cat toys based on an endless track and a ball, such as Graves' U.S. Pat. No. 5,351,650. The problem with these chew and play boys is that they contain no treat, flavor, or scent which is releasable as a result of biting the toy and an animal will lose interest to these toys rather quickly.

If an attractive odor or flavor is added to the chew and play toy, the toy generally is more attractive to an animal. There are inventions that show chew and play toys with added odor or flavor, such as shown in Allis' U.S. Pat. No. 1,149,170, Axelrod's U.S. Pat. Nos. 3,871,334 and 5,339,771, and Edwards' U.S. Pat. Nos. 4,513,014 and 4,557,219. A problem with these inventions is that only one flavor can be impregnated into the toy item and they do not release a predetermined item as a result of biting the toy.

Some inventions show devices that allow animal food, treat, or odor-producing substance to be placed in a container in the chew and play toy, called a treat container. These toys are more activating and stimulating for an animal, since the animal tries to gain access to the animal food, treat, or odor-producing substance in the toy. Typically, the animal has to perform a simple task, or solve a problem to gain access to the animal food, treat, or odor-producing substance in the toy. In general, animals tend to play longer with toys that require a simple task to be performed than with toys that do not require a task to be performed in order to operate the toy, and do not contain any animal food, treat, or odor-producing substances.

For example, chew and play toys containing animal food, treat, or odor-producing substances are shown in Chill's U.S. Pat. No. 5,595,142, Van Natter III et al's U.S. Pat. No. 5,553,570, Houghton et al's U.S. Pat. No. 5,343,828, and Jorgensen's International Patent Cooperation Treaty application PCT/DK95/00257. Also, some generally available chew and play toys allow animal food, treat, or odor-producing substance to be placed in them, such as the Kong Inc.'s Kong toys shown on page 63 in R. C. Steele Wholesale Pet and Animal Care Supplies catalog, Summer Preview 1997 edition.

All these toys, however, have specific and similar problems. Chill's U.S. Pat. No. 5,595,142; and the Kong Inc.'s Kong toys can contain animal food, treat, or odor-producing substance mainly in paste form, limiting the available selection of animal food, treat, or odor-producing substances, and making the toys harder to refill and clean than when using solid animal food, treat, or odor-producing substances. In both of these toys, it would be difficult to make any solid animal food, treat, or odor-producing substance stay in the toy.

Van Natter III et al's U.S. Pat. No. 5,553,570, can contain solid and paste form animal food, or treat, or odor-producing substance, but it does not allow the animal to access the substance in the container without help from a person. Therefore, it offers no challenging problem to be solved by the animal. Also, the animal cannot play with this toy independently without help from a person.

Houghton et al's U.S. Pat. No. 5,343,828, and Jorgensen's International Patent Cooperation Treat application PCT/DK95/00257, offer a problem to be solved to the animal, but they are mainly limited to solid animal food, treats, or odor-producing particles having quite narrow size and shape limitations because of the open holes in these toys. If the animal food, treat, or odor-producing substances used in these toys have particle sizes too small, the particles can fall out too easily, and if the particle sizes are too large, the animal cannot extract them without chewing the particles in the toy to make the particles smaller. In addition, the problem solving skills of the animal do not necessarily affect how quickly the animal can gain access to the animal food, treat, or odor-producing substances inside the toy. This can be frustrating to the animal. Usability of these toys can also cause problems. Houghton et al's U.S. Pat. No. 5,343,828 involves a locking mechanism, which makes the refilling of the toy complicated. In Jorgensen's International Patent Cooperation Treaty application PCT/DK95/00257, the cleaning of the toy can be a problem, since the toy does not offer a good access to the interior of the toy. Also, both of these toys need to be made of a rather stiff material, such as hard plastic, in order to be practical to manufacture, and to function properly. This can cause quite disturbing noise when an animal plays with these toys by rolling them on the floor. In addition, both of these toys are hard to modify to be used as component treat containers embedded in other toys in the market.

The present invention overcomes the problems of the prior art and, in addition, provides a new concept in an interactive pet toy which provides an extraction problem to the pet in figuring out how to extract the treat from the toy while simultaneously providing an incentive to the animal by providing a sound and scent attractant to the animal to induce it to continue playing with the toy until it extracts the treat and silences the sound.

SUMMARY OF THE INVENTION

The present invention is a chew and play toy having treat container for animals comprising an elastic or flexible housing having an interior space and at least one slit or narrow opening of elongated shape through the housing to the interior space. The slit or narrow opening has a shape and size such that the slit or narrow opening will widen into a hole when pressure is applied to the ends of the slit or narrow opening. The hole is closable back to the slit or narrow opening configuration when pressure applied to the ends of the slit or narrow opening is eased. The hole is of sufficient size to allow the filling and emptying of the interior space through the hole of at least one predetermined item made of material potentially attractive to the animal, such as animal food, treat or odor-producing substance, whereby the toy can contain the item without letting it fall out through the slit or narrow opening as easily as through an open hole. The slit or narrow opening can occasionally be opened by an animal by biting or squeezing the toy to gain access to the item placed into the interior space of the toy.

OBJECTS OF THE INVENTION

It is therefore an important object of the present invention to provide a chew and play toy for animals having a treat container designed for holding various sizes and shapes of solid animal food, treat, or odor-producing substances.

It is another object of the present invention to provide a treat container which can be used as a component treat container embedded in other toys offered in the market.

It is a further object of the present invention to provide a closure for a treat container which can keep the animal food, treat, or odor-producing substances inside the treat container from falling out as easily as from a treat container with open holes.

It is still another object of the present invention to provide a closure for a treat container which can be opened by squeezing the container to gain access to the items placed in there.

It is still a further object of the present invention to provide a chew and play toy for animals which is a treat container which can be opened by the animal by biting in order to gain access by the animal to the food, treat, or odor-producing substances inside the toy.

It is yet another object of the present invention to provide a problem to be solved to the animal with different degrees of difficulty.

It is yet a further object of the present invention to provide a chew and play toy for animals to play with and which can be actuated during play by the animal to release a treat without need for help from a person.

It is still yet another object of the present invention to provide a chew and play toy for animals which is a treat container with easy access to the interior of the toy for cleaning purposes.

And it is still yet a further object of the present invention to provide a chew and play toy for animals which is a treat container which can be made in the form of a humorous face in which the mouth can be forced open by biting to disgorge the enclosed treat.

Other objects and advantages of the present invention will become apparent when the description of the preferred embodiment of the present invention is considered in conjunction with the accompanying drawings.

DESCRIPTION OF THE DRAWINGS

In the drawings, closely related figures have the same number but different alphabetic suffixes.

DESCRIPTION OF THE PREFERRED EMBODIMENT

Figure 1A:
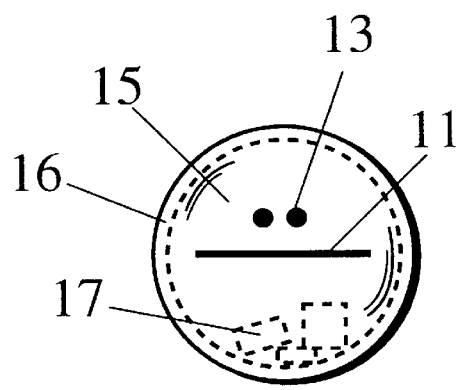
FIGS. 1A and 1C show front elevations of the preferred embodiment of the chew and play toy of the present invention.
Figure 1B:
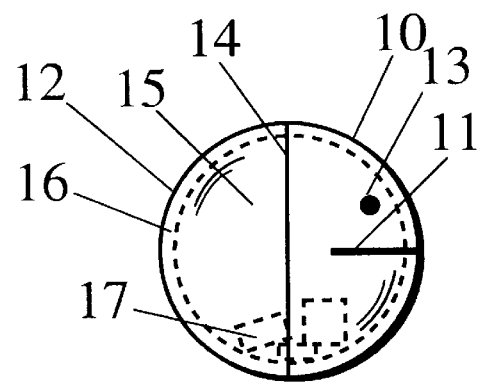
FIGS. 1B and 1D show side elevations thereof.

Reference is made to the drawings for a description of the preferred embodiment of the present invention wherein like reference numbers represent like elements on corresponding views.

Reference is made to FIGS. 1 and 2. The preferred embodiment of the toy of the present invention is illustrated in FIGS. 1A to 1D. In the preferred embodiment, the toy is typically a generally spherical hollow container having a slit 11 in it. If it is made in two sections, the top 10 is connected to a base 12, which are typically generally hemispherical hollow sections. When connected together, the top and the base form a flexible treat container with an interior space 15. The shape and size of the top and base can be varied depending on the design of the toy and the size of interior space required in the toy. In FIGS. 1A to 2F, the toy is shaped as a ball.

In the preferred embodiment, the top 10 and the base 12 are made of elastic or flexible material such as rubber. However, the top and base can consist of any other materials that can be repeatedly bent without fracturing, such as polyethylene, polypropylene, vinyl, nylon, leather, various impregnated or laminated fibrous materials, various plasticized materials, etc. The top can be made of a different material than the base.

In the preferred embodiment, the top 10 typically measures from 30 mm to 500 mm long, depending on the size of the animal. For example, the suitable length of the top in a toy mainly intended for chewing for a medium-sized dog would be about 70 mm, while the length of a top in a toy mainly intended for playing with the front legs would be about 300 mm. The thickness of a wall 16 of the top is typically between 1% to 10% of the length of the top, depending on the material used and the stiffness desired for the toy. For example, the suitable thickness of the wall would be about 7 mm for a top made of rubber and having length of about 70 mm.

In the preferred embodiment shown in FIGS. 1A to 1D, the base 12 is shaped as a hemisphere having the same dimensions as the top 10, and is made of rubber. A requirement for the base is that it covers the slit 11 on the top so that a treat container having interior space 15 is formed. The base typically measures less than 400 mm in any direction, but can also be larger if desired. The thickness of the wall 16 of the base can be different from the thickness of the wall of the top.

In the preferred embodiment, the top 10 and base 12 are typically made from two molded hollow parts, which are connected together along a seam 14. The seam may also run in other directions than between the top and the base, if desired. If the top and base are separate objects, they may also be connected with glue, screws, threads, snap lock joint, or any other method suitable for connecting the top and base together. The top and base do not need to be separable.

Figure 2A:
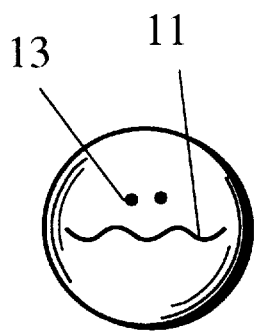
FIGS. 2A–2F show alternative embodiments thereof in front elevation.
Figure 2B:
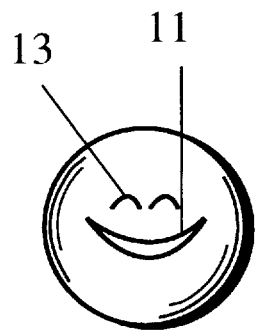
Figure 2C:
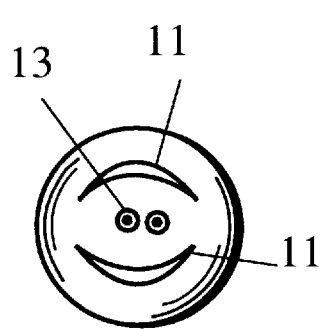
Figure 2D:
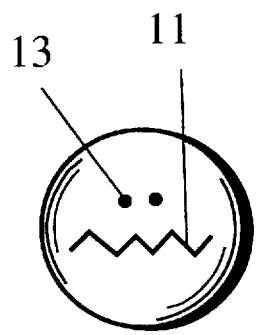
Figure 2E:
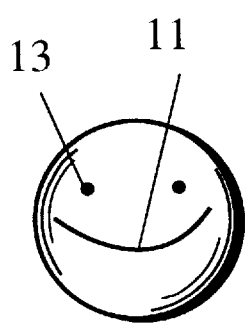
Figure 2F:
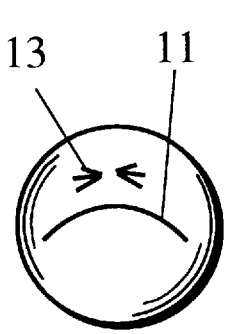

There is at least one slit 11 through the top 10 to the interior space 15. The slit acts as a closure for the interior space. a plurality of slits can be used on the top, if desired, such as shown in FIG. 2C. The slit must have a shape and size such that the slit will widen into a hole when pressure is applied to the ends of the slit. In the preferred embodiment, the material selected for the top is elastic or flexible, so that the slit is closable when pressure applied to the ends of the slit is eased. The hole that is formed when pressure is applied to the ends of the slit has to be of sufficient size to allow the filling and emptying of the interior space with a treat 17. The treat comprises predetermined items such as animal food or odor-producing substances placed inside the toy through the hole. Additional slits can be used in the base 12. Typically, the slit is straight or slightly curved, but can also have other elongated shapes, if desired. For example, the slit can look like a mouth. Some other possible shapes for the slit are shown in FIGS. 2A to 2F. Other possible shapes for slit 11 will be apparent to those skilled in the art. In the preferred embodiment, the length of the slit is about 80% of the length of the top. However, the length of the slit can vary between 50% and 100% of the length of the top depending on the design, materials used, and the desired stiffness of the top.

If the toy is ball-shaped, the slit 11 is typically punched across the top of the top 10 after the top and base 12 have been joined together. The slit can also be punched through the top before it is joined to the base. In addition to punching, the slit can also be made using other methods, such as cutting, sawing, machining, drilling, or any other suitable method. If the seam 14 runs along the slit, the slit can also be made by leaving part of the seam open between the top and the base when the top and base are connected.

If desired, ornaments 13 can be placed around the slit 11 to make the toy look like a face, for example, as shown in FIGS. 1A to 2F. Ornaments can be placed on the toy with any suitable method, such as painting, printing, engraving, or sewing.

Figure 3A:
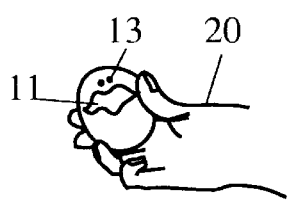
FIGS. 3A–3C show various methods for opening the treat container of the present invention by applying pressure to the toy or treat container.
Figure 3B:
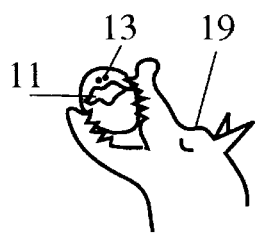
Figure 3C:
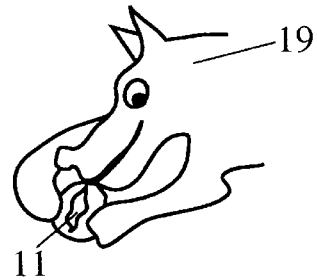
Figure 4A:
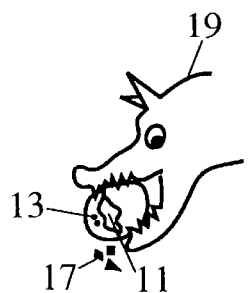
FIGS. 4A–4C show various methods how an animal can gain access to items placed in the treat container of the present invention.
Figure 4B:
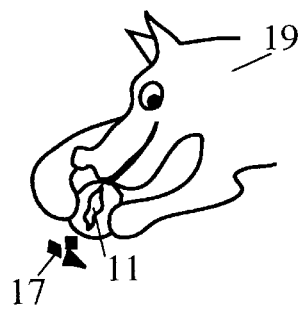
Figure 4C:
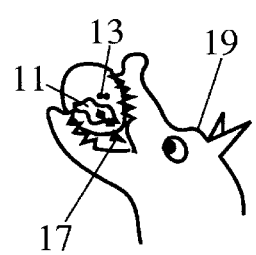

Reference is made to FIGS. 3–5 for a description of the operation of the preferred embodiment of the invention. The manner of using the toy for animals is similar to that of other animal toys in present use. The difference is that in the preferred embodiment, one first puts a treat 17 into the interior space 15 in the toy, and then gives the toy to the animal to play with. Usually, an animal plays with the toy by chewing, pulling and pushing it, or moving it around with its nose, teeth, and front legs.

Figure 1C:
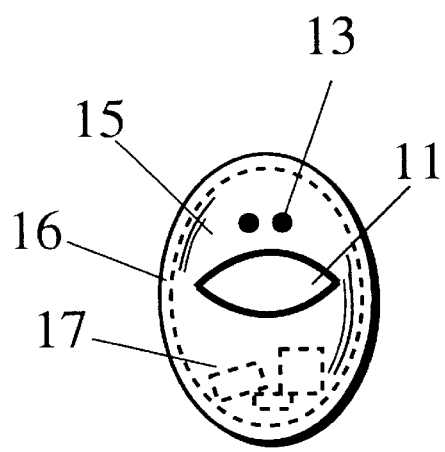
Figure 1D:
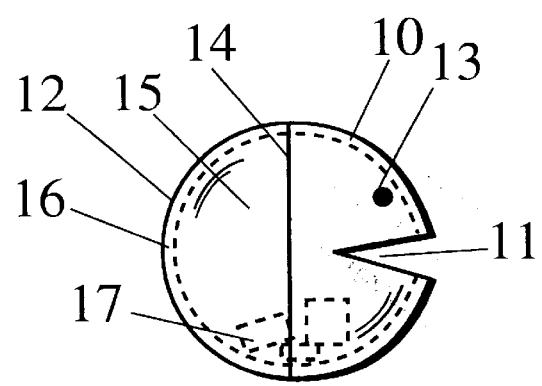
Figure 5A:
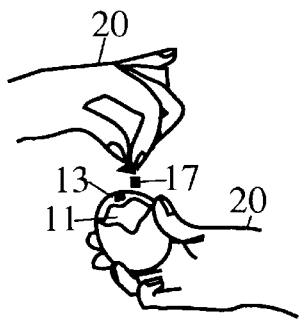
FIGS. 5A–5B show the refilling, emptying, and cleaning of the treat container.

Filling and refilling of the interior space 15 of the toy is done by holding the toy in one hand, and squeezing it at the ends of the slit 11 as shown in FIG. 5A. When pressure is applied to the ends of the slit, the slit widens as shown in FIGS. 1C and 1D, and in FIG. 3A. When the slit is open, a treat 17 can be placed in the interior space of the toy, as shown in FIG. 5A. When pressure to the ends of the slit is eased, the slit is closable. The slit tends to close automatically if the material used in the toy is elastic or flexible. The slit typically closes enough to keep the treat from falling out of the opening when the toy is turned so that the slit points down. In general, the toy can contain the treat, without letting the treat fall out through the slit as easily as through an open hole. The maximum size of particles in the treat should be such that the particles fit through slit 11 in at least one orientation when the slit is fully open. The minimum size of particles in the treat should be such that the particles will not fit through the slit in at least one orientation when the slit is closed. The challenge of the toy to the animal can be varied by changing the size and shape of particles in the treat, since larger particles are harder to get out of the toy than smaller particles. The treat can also consist of particles of various sizes.

When the toy is given to an animal, the animal typically starts playing with the toy without need for help from a person. An animal is usually able to smell the treat 17 in the interior space 15 of the toy because the slit 11 does not close fully. The animal typically tries to gain access to the treat in the interior space offering a task, or a puzzle, to be solved to the animal. The animal 19 can gain access to the treat in the interior space by applying pressure to the ends of slit by biting or squeezing the toy to open the slit, as shown in FIGS. 3B to 3C. If the toy happens to be turned so that the slit points down when the pressure is applied to the ends of the slit to widen it, some or all of the circular path, and the open slit is facing towards the outside of the circular path, the centrifugal force may cause some or all of the treat to fall out. Getting the treat out of the toy may also be helped by shaking the toy. When some or all of the treat falls out of the toy, the animal can pick up the treat from where it has fallen.

Figure 5B:
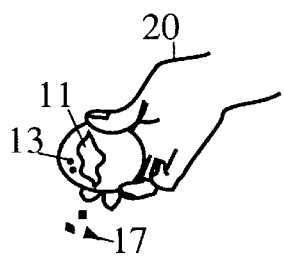
Figure 5C:
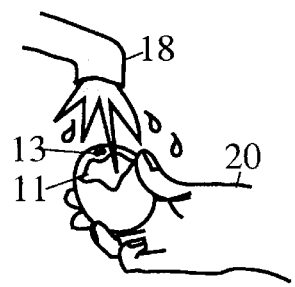

Emptying the toy of the unwanted treat 17 in the interior space 15 can be done by applying pressure to the ends of the slit 11 to widen it into a hole, turning the toy so that the slit faces down, and pouring the treat out, as shown in FIG. 5B. Emptying the toy of the treat may be aided with shaking the toy. Also, a finger or some additional tools can be used to empty the toy, such as a stick, brush, etc. Assuming that the toy is manufactured of a material that can be washed, such as rubber, the toy and interior space inside the toy can be washed by rinsing with water 18 or a cleaning solution, as shown in FIG. 5C. Washing the interior space may also be aided by a finger, or some additional tools, such as a brush.

Accordingly, it will be apparent from the foregoing description that the chew and play toy and treat container of the present invention in its preferred form can achieve the objects and advantages attributable thereto.

Although the description above contains many specificities, these should not be construed as limiting the scope of the invention but as merely providing illustrations of some of the presently preferred embodiments of this invention, and the scope of the invention should not be limited to such specificities as have been set forth except as may be necessitated by the appended claims and their legal equivalents rather than by the examples given.

I claim:

1. A chew and play toy forming a releasable treat container for hidden treats for animal comprising a flexible housing enclosing an interior space, and at least one slit opening communicating through said housing with said interior space, said slit opening being closeable and opening into a hole when pressure is applied to said housing proximate to the ends of said slit opening, said hole closing to said slit opening when said pressure is released, said slit when opened to a hole being of sufficient size to allow filling and emptying of said interior space through said hole with at least one item of variable size made of a material potentially attractive to an animal, said slit being occasionally opened to a hole by an animal by biting said toy to release an item placed into said interior space thereof when said slit is oriented to point generally downward or when said toy is shook while being bitten whereby said item can fall or eject out of said hole formed by said animal biting said toy.

2. The toy of claim 1 wherein said flexible housing is a ball.

* * * * *